United States Patent [19]

Spils

[11] 4,363,464
[45] Dec. 14, 1982

[54] ANGLE GLOBE VALVE

[76] Inventor: Richard W. Spils, 2225 Spenard Rd., Anchorage, Ak. 99503

[21] Appl. No.: 165,694

[22] Filed: Jul. 3, 1980

[51] Int. Cl.³ .................................................. F16K 47/04
[52] U.S. Cl. .................................. 251/121; 251/127; 251/266; 251/355
[58] Field of Search ............... 251/127, 266, 121, 355; 137/625.3, 614.11

[56] References Cited

U.S. PATENT DOCUMENTS

| | | | |
|---|---|---|---|
| 1,510,528 | 10/1924 | Sebenste | 251/266 |
| 1,976,796 | 10/1934 | Milner | 251/266 |
| 3,485,474 | 12/1969 | Baumann | 251/121 |
| 3,637,188 | 1/1972 | Ung | 251/266 X |
| 3,730,479 | 5/1973 | Baumann | 137/625.3 |

FOREIGN PATENT DOCUMENTS

| | | | |
|---|---|---|---|
| 2745161 | 4/1979 | Fed. Rep. of Germany | 251/127 |
| 584729 | 11/1958 | Italy | 251/121 |

OTHER PUBLICATIONS

"Chemical Engineering", Mar. 6, 1972, Article *Special Control Valves*, pp. 91-98.
Masoneilan Bulletin No. 373E, Jul. 5, 1977.

*Primary Examiner*—Arnold Rosenthal
*Attorney, Agent, or Firm*—Klarquist, Sparkman, Campbell, Leigh, Whinston & Dellett

[57] ABSTRACT

A high pressure multistage valve in which a multi-flanged plug is shiftable vertically within a passage provided by a stack of encircling rings, which can be readily exchanged or replaced. A turnable stem effects linear movement of the plug via a motion converting mechanism located in the interior of the valve. A lubricating system for the mechanism has a movable interface with the fluid being controlled.

7 Claims, 11 Drawing Figures

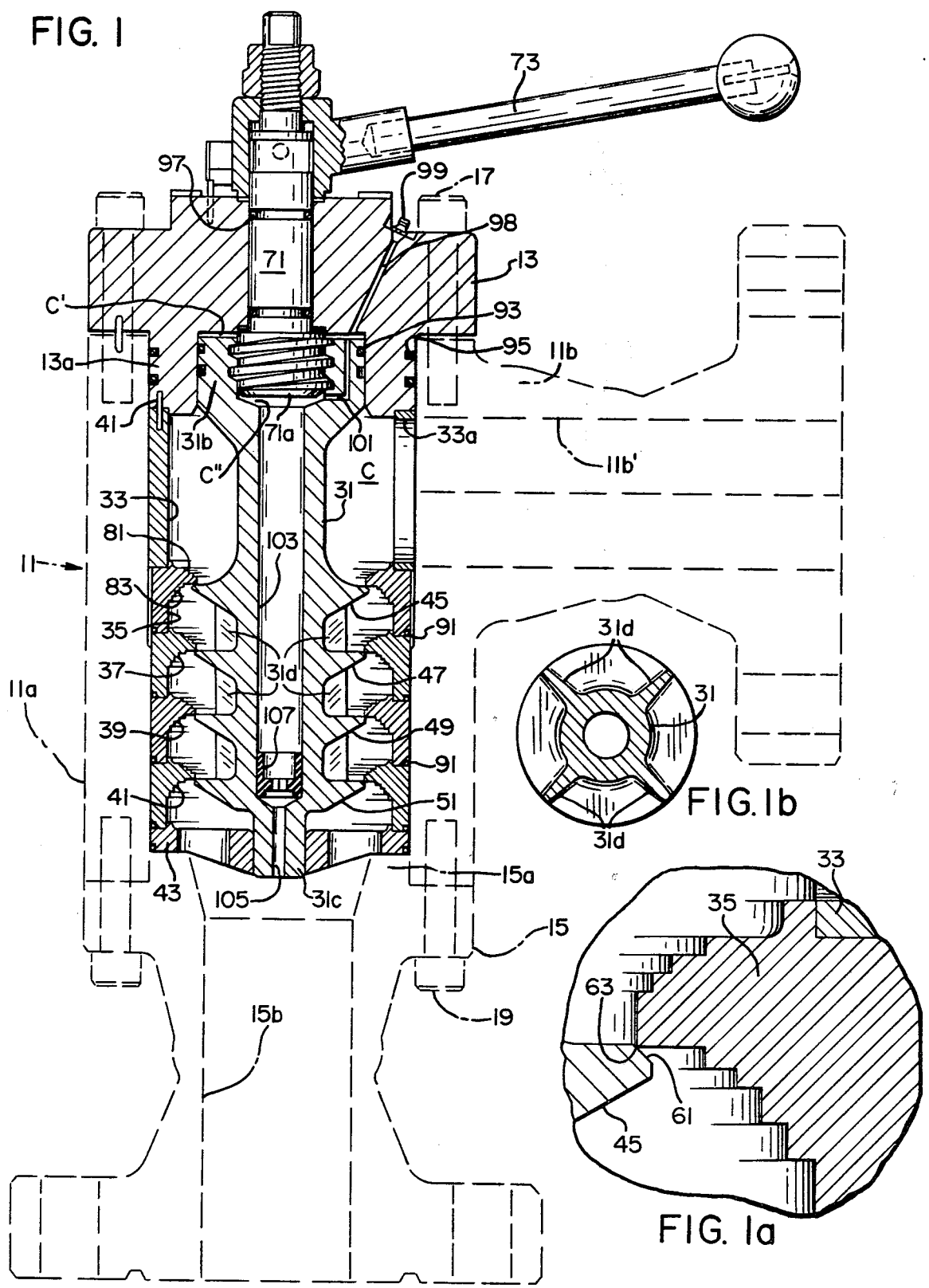

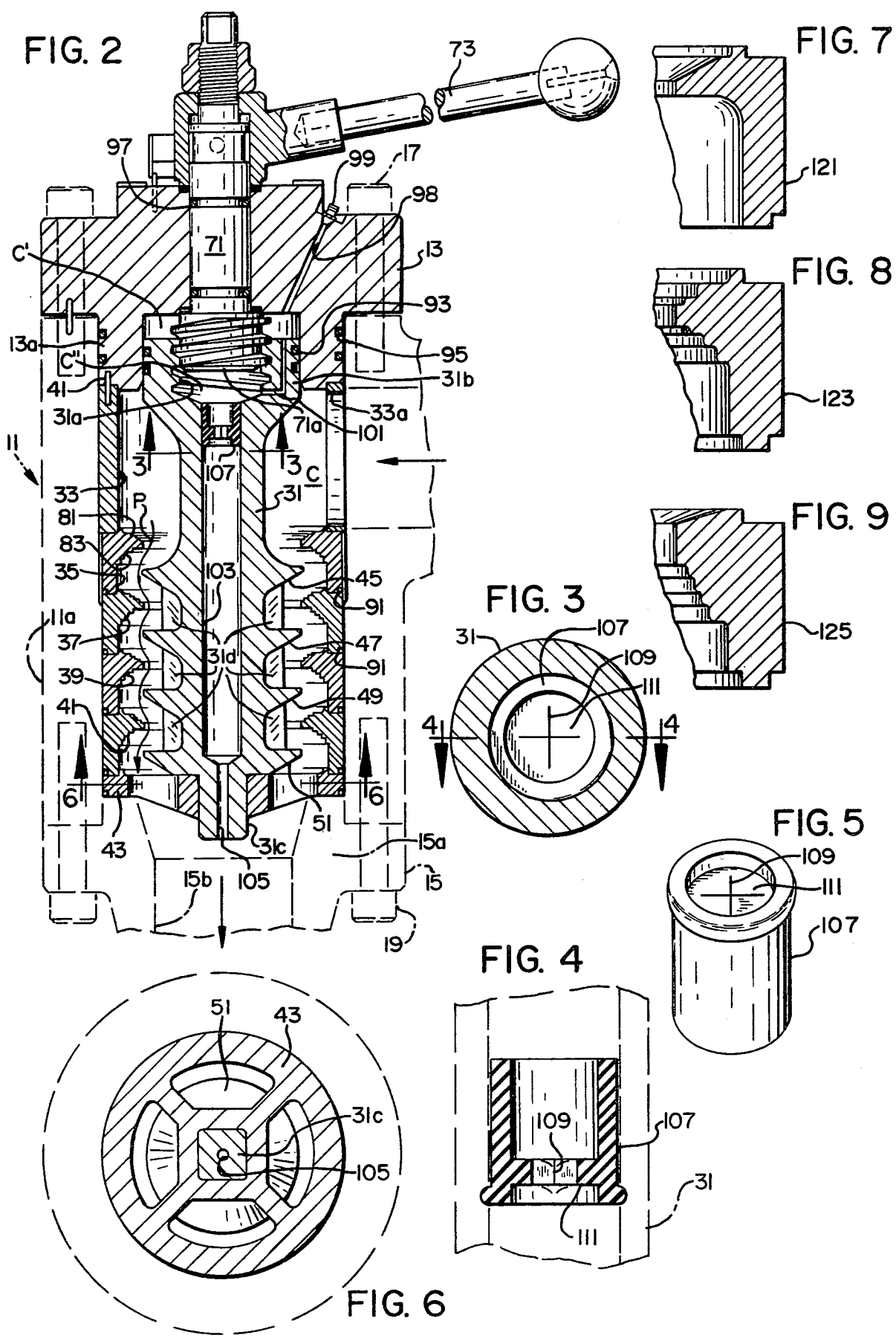

ANGLE GLOBE VALVE

The present invention relates to multiple stage high pressure valves for handling fluids, more commonly liquids, but also gases, or sometimes a mixture of the two. To meet increasingly sophisticated problems, industry has insisted on higher and higher pressures. This has been accompanied by a greater range of problems in handling higher pressure drops and fluid velocities.

Multiple stage valves of the type under consideration have achieved fluid control by employing either radial flow through plural multistage orifices, or axial flow through a labyrinth path.

The latter type, to which the present invention relates, has had a particular problem: not being versatile or adaptable to the greater range of operating parameters now required. Also, maintaining a tight seal between the axially moving valve stem and the associated valve bonnet is mechanically more complicated.

SUMMARY

The present invention overcomes the above-recited problem in providing a valve whose versatility, flexibility and adaptability has been remarkably increased by providing a stack of discrete stage rings which define the labyrinth flow path. These rings can be readily altered or interchanged with rings of differing configuration to meet the parameters of different operating conditions.

The ring stack concept enables the provision of a kit for converting an existing valve to one of my design. Also, my ring stack is so configured as to enable the use of cast rings requiring minimal machining operations.

The leakage problem has been overcome by utilizing a turning stem rather than an axially slidable one, and by providing a motion converting mechanism within the pressure chamber to achive axial movement of the valve plug upon turning movement of the stem.

A main object of the present invention is to provide an improved multistage high pressure valve, particularly one that readily can be customized for particular operating conditions, or altered to handle a change in such conditions.

Another object is to provide a valve of the above type which by design takes advantage of the simplicity of rotary shaft seals.

Various other objects of the invention will be apparent from the following description taken in connection with the accompanying drawings wherein:

FIG. 1 is a vertical midsection through an angle globe valve of my invention, showing the valve closed;

FIG. 1a is a fragmentary view of a portion of FIG. 1;

FIG. 1b is a cross section through the plug;

FIG. 2 is a view like FIG. 1 but with the valve fully open;

FIG. 3 is a cross section taken along line 3—3 of FIG. 2;

FIG. 4 is a enlarged fragmentary view of the lubricant sealing plug;

FIG. 5 is a perspective view of the plug;

FIG. 6 is a cross section taken along lines 6—6 of FIG. 2;

FIGS. 7-9 are fragmentary sections through stack rings of other configurations.

The FIG. 1 angle valve has a body 11 disposed between a bonnet flange 13 and an outlet flange 15, the flanges being secured to the body by bolts 17 and 19 respectively. The body and the outlet flange are of conventional form, and thus are shown in broken lines. The bonnet is of a slightly modified form, while the interior parts are new, so that these are shown in solid lines. The bonnet flange and interior parts may be considered as a kit for converting an existing valve to one of my design. Of course, an original valve of my design may be produced utilizing both the broken and solid lined parts of FIG. 1.

The body 11 commonly has an upright cylindrical portion 11a from which an internal inlet flange portion 11b projects at right angles. Within the cylindrical portion 11a is a stack of rings, encircling a valve member in the form of a plug 31, which is designed to move vertically, as the parts are shown in FIG. 1. The ring stack includes a spacer tube 33, four stage rings 35, 37, 39 and 41, and a spider guide ring 43.

This ring stack is clamped between a boss 15a on outlet flange 15, and a boss 13a on the bonnet flange 13. The combined height of the ring stack and the bosses is slightly greater than that of the cylindrical portion 11a to facilitate the clamping relationship. In order to properly orient an inlet portion 33a of the spacer tube 33 with the inlet passage 11b of the inlet flange portion 11b, an alignment pin 41 is provided. It fits in appropriate bores formed in opposing faces of the boss 13a and the tube 33.

The plug 31 is formed with a series of annular flanges or flaring steps 45, 47, 49 and 51, spaced like the rings 35-41, and cooperatively related to said rings. The upper step has a hardened beveled edge 61 (FIG. 1a) seating against an edge 63 of the ring 15, while the diameters of the other steps are just slightly less than the interior diameters of the associated stage rings so as not to interfere with good seating contact at 61-63. The plug 31 may be moved vertically from its closed position in FIG. 1 to its fully opened position in FIG. 2 or at any position therebetween. In its fully opened position, a labyrinth path P (FIG. 2) is provided by which high pressure fluid in the cavity or chamber C, defined by the spacer tube 33, is decreased in stages from that in the cavity, to a lower pressure in the outlet passage 15b of the outlet flange 15.

If the vertical axial movement of the plug 31 is achieved by an axially moving stem, greater sealing problems are presented than with a turning stem. I achieve the advantages of a turning stem, with axial plug movement, by providing a motion converting mechanism within the valve body.

Referring to FIG. 2, the valve has a turnable valve stem 71 projecting through a bore in the bonnet flange 13. The stem is turned by a handle 73 fixed to the stem, or optionally the stem may be turned by any other device, powered or otherwise.

The motion converting mechanism includes the lower end of the stem which is lead-screw threaded at 71a (FIG. 2) to threadedly engage female threads 31a-formed in an enlarged upper end 31b of the plug 31. The lower end of the plug has a non-circular stub 31c (FIGS. 2 and 6) slidably but non-rotatably received in a central bore provided by the spider guide ring 43.

The guide ring is held against turning movement by being clamped against boss 15a. Hence, as handle 73 is turned, causing relative movement between the threaded stem portion 71 and the threads on the plug 31, the plug is moved downwardly an extent depending on the amount the handle is turned. Preferably, the threads 71a are so designed that slightly less than 360° movement of the handle will shift the plug from its fully closed to its fully opened position.

Each stage ring may be considered as comprising a ring portion and an inwardly extending annular flange, each of which has an upstream face, a downstream face and an intermediate face. Each upstream face is formed with plural upper stepped portions or ridges 81 and each downstream face plural stepped portions or lower ridges 83. These ridges create turbulent flow and thus good frictional contact between the flowing fluid and the stage rings. This effects a transformation of the kinetic energy of the fluid into heat energy, which is carried away by the fluid passing through the valve.

Note that the two stage ring ridges closest the controlling edge of the respective plug step participate in the control of the fluid flow, to accomplish double orificing at each stage of the valve.

When the plug 31 is moved to its closed position, a fluid seal is provided at the seat 61. I provide a series of O-ring seals 91 to prevent fluids from bypassing the seat 61, by traveling downwardly between the exterior surfaces of the stage rings and the interior surface of the body 11, and entering the flow passage at any of the meeting faces of the stage rings, with one another or with the guide ring, or entering between the meeting faces of the guide ring and the boss 15a. I provide other O-ring seals 93 between the large, what might be termed piston, portion of the plug 31 and the opposed surfaces of the boss 13a. Still other O-ring seals are provided at 95 and 97 to prevent leakage.

I provide means for lubricating the threaded connection at 71a—31a. This includes a drilled hole 98 (FIG. 2) through the bonnet flange 13. A grease fitting 99 is provided at the upper end of the hole to enable grease to be pumped through the hole and into a cavity C' above the plug. A hole 101 is provided in the upper end of the plug in bypassing relation to the threaded stem portion 71a so that grease can be supplied to a cavity C" in the plug and have access to the threads 31a. Preferably the hole 101 is formed in the lower end of the stem rather than in the plug, because it can be more fully formed in the stem.

When the plug is moved downwardly, the cavities C' and C" enlarge. To accommodate this change in volume, I provide a central bore 103 within the plug, communicating at one end with the cavity C", and at its other end with the outlet passage 15b via a small bore 105. A rubber plug 107 is slidably received by the bore 103 to separate the grease in the cavities C' and C" from the fluid being controlled by the valve.

With the plug 31 in its closed position, grease is pumped into the chambers C' and C" forcing the plug 107 downwardly until it seats at the lower end of the bore 103. The plug has a cross slit 109 (FIG. 3) in a central flange 111. When the plug reaches the lower end of its travel and further grease is injected to make sure that the plug is fully down, the excess can force its way through the slit and into the bore 105.

Now, as the plug is lowered and the cavities C' and C" enlarge, the plug 107 will be forced upwardly by the fluid pressure beneath it, to fill the larger cavities with grease. When the plug is closed, the grease in the cavities is expelled therefrom forcing the plug 107 downwardly to the FIG. 1 position.

The bores 103 and 105 and the cavity C" provide a balanced pressure plug in that the pressure in the outlet passage 15b is transmitted by the bores and cavities to the upper face of the plug. The diameter of the piston portion 31b of plug 31 is made smaller than the outside diameter of the rings 45–51, to achieve a net axial downward force on the plug to make for stable plug positioning.

Preferably I provide plural flanges 31d (FIG. 1b) on the plug 31 which function as vertical flow dividers between the plug steps. They prevent vortexing flow, serve as alignment guides in assembly, and stiffen the plug.

FIGS. 7, 8 and 9 show optional forms of stage rings 121, 123 and 125 to achieve different types of turbulence. These rings may be used as a stack of stage rings all of a kind, or intermixed to achieve desired results.

While I preferably utilize a motion converting mechanism as described previously herein, to avoid the seating problems of an axially movable stem, I point out that with my balanced plug concept, my valve can readily adapt to many fields of activity, particularly certain oil field uses, which to a considerable extent require axially movable plugs. Thus, in such installation, the plug 31 will be removed and replaced by either an integral plug-stem unit or by a plug stem assembly, articulatedly connected together. Note that the balanced plug concept is retained, because the replacement plug will be suitably drilled and bored to provide this feature.

An advantage of stack ring concept, not pointed out previously, is that the rings and plug may be cast, since the only machining required is at the metal-to-metal contacting surfaces. The roughness of a cast surface aids in creating turbulence, so it is beneficial to the action of the ridges 81 and 83.

What is claimed is:

1. In a multiple stage valve having walls defining a cavity, a stack of separate stage rings arranged within said cavity, said stage rings defining a flow passageway for conducting fluid from an inlet in said body axially through said stack to an outlet from said body, and a valve member within said cavity cooperatively related to said stage rings to control said axial fluid flow through said valve, each stage ring having a ring portion and an inwardly projecting annular flange, said flange having an upstream face, a downstream face, and an intermediate face, said downstream face of at least certain rings being formed with plural stepped portions.

2. In a multiple stage valve of the type recited in claim 1 wherein:

said valve member has plural valve elements, one for each stage ring, each valve element being spaced from the associated stage ring substantially the same distance, the downstream face of each of said flanges intersecting the intermediate face of such flanges at a corner, the upstream most valve element being formed with a portion for engaging the corner of the associated stage ring.

3. In a multiple stage valve of the type recited in claim 1 wherein:

each of said valve elements comprising an annular flange, each flange being generally non-symmetrical about a medial plane through the flange with the upstream face being more abruptly related to the axis of the valve member than the downstream face.

4. A multiple stage valve of the type recited in claim 3 wherein:
   each of said valve member annular flange having its peripheral portion disposed downstream of the corner of the associated stage ring.

5. A multiple stage valve of the type recited in claim 4, in which
   each face of each of the ring flanges having plural stepped portions.

6. A multiple stage valve as recited in claim 1 wherein:
   at least certain of said stage rings are castings,
   the upstream and downstream faces of each of said certain stage rings being unmachined to provide rough surfaces for frictional contact with fluid being handled.

7. In a multiple stage valve,
   a valve body formed with a through bore intersected adjacent one end by an inlet passage,
   an outlet flange member having a boss projecting into one end of said bore,
   a bonnet flange member having a boss projecting into the other end of said bore,
   a stack of stage rings nested within said bore,
   a spider guide ring interposed between the boss of said outlet flange member and said ring stack,
   a spacer tube interposed between the boss of said bonnet flange member and said stack and being formed with an opening of a size similar to that of the inlet passage,
   means on said bonnet flange member for holding said spacer tube with its opening in alignment with said inlet passage,
   a valve member engaging said spider member and having portions in cooperative relationship to said stage rings, and having a portion projecting through said bonnet flange member to facilitate actuation of said valve member,
   the combined height of said bosses, said stack of stage rings, said spider, and said spacer tube being greater than the length of said bore,
   and means for bolting said bonnet flange member and said outlet flange member to said body to clamp the intervening elements therebetween.

* * * * *

UNITED STATES PATENT OFFICE
CERTIFICATE OF CORRECTION

PATENT NO. : 4,363,464
DATED : December 14, 1982
INVENTOR(S) : RICHARD W. SPILS

It is certified that error appears in the above-identified patent and that said Letters Patent are hereby corrected as shown below:

Column 1, line 59, change "a" to --an--.

Column 2, line 11, change "internal" to --integral--.

Column 2, line 32, change "15" to --35--.

Column 3, line 8, insert "is formed with" following --face--.

Column 3, line 41, change "fully" to --readily--.

Column 4, line 1, change "outside" to --inside--

Column 5, line 3 (claim 4) change "flange" to --flanges--.

Signed and Sealed this

Fifteenth Day of March 1983

[SEAL]

Attest:

GERALD J. MOSSINGHOFF

Attesting Officer

Commissioner of Patents and Trademarks